United States Patent
Porzio et al.

(10) Patent No.: US 6,416,799 B1
(45) Date of Patent: Jul. 9, 2002

(54) ENCAPSULATION COMPOSITIONS

(75) Inventors: Michael A. Porzio, Monkton; Lewis M. Popplewell, Cockeysville, both of MD (US)

(73) Assignee: McCormick & Company, Inc., Sparks, MD (US)

(*) Notice: Subject to any disclaimer, the term of this patent is extended or adjusted under 35 U.S.C. 154(b) by 0 days.

(21) Appl. No.: 09/709,529

(22) Filed: Nov. 13, 2000

Related U.S. Application Data (60) Division of application No. 09/299,733, filed on Apr. 27, 1999, now Pat. No. 6,187,351, which is a division of application No. 08/763,148, filed on Dec. 10, 1996, now Pat. No. 5,897,897, which is a division of application No. 08/424,572, filed on Apr. 17, 1995, now Pat. No. 5,603,971, which is a continuation of application No. 08/098,885, filed on Jul. 29, 1993, now abandoned, which is a continuation-in-part of application No. 08/047,196, filed on Apr. 16, 1993, now abandoned.

(51) Int. Cl.$^7$ ............................... A23L 1/22; A23G 3/00
(52) U.S. Cl. ............................ 426/96; 426/98; 426/650; 426/651; 426/658; 426/103
(58) Field of Search ........................... 426/96, 98, 650, 426/651, 658, 103

(56) References Cited

U.S. PATENT DOCUMENTS 4,713,251 A * 12/1987 Seighman
5,601,865 A * 2/1997 Fulger et al.

* cited by examiner

*Primary Examiner*—Anthony J. Weier
(74) *Attorney, Agent, or Firm*—Oblon, Spivak, McClelland, Maier & Neustadt, P.C.

(57) ABSTRACT

Carbohydrate-based glassy matrices which are stable in the glassy state at ambient temperatures may be prepared by the use of aqueous plasticizers with melt extrusion. Such glassy matrices are useful for the encapsulation of encapsulates, in particular, flavoring agents.

21 Claims, 1 Drawing Sheet

FIG. 1

ENCAPSULATION COMPOSITIONS

This application is a Divisional of application Ser. No. 09/299,733 filed on Apr. 27, 1999 now U.S. Pat. No. 6,187,351 which is a divisional of Ser. No. 08/763,148, filed Dec. 10, 1996, now U.S. Pat. No. 5,897,897, which is a divisional of Ser. No. 08/424,572, filed Apr. 17, 1995, now U.S. Pat. No. 5,603,971, which is a continuation of Ser. No. 08/098,885, filed Jul. 29, 1993, abandoned, which is a continuation-in-part of Ser. No. 08/047,196, filed Apr. 16, 1993, abandoned.

BACKGROUND OF THE INVENTION

1. Field of the Invention

The present invention relates to encapsulation compositions in which an encapsulate is encapsulated in a glassy matrix. More particularly, the present invention relates to flavor encapsulation compositions in which a flavoring agent is encapsulated in a glassy matrix.

2. Discussion of the Background

The encapsulation of encapsulates is an area of active research. In particular, the encapsulation of encapsulates such as medications, pesticides (including insecticides, nematocides, herbicides, fungicides, microbicides, etc.), preservatives, vitamins, and flavoring agents is desired for a number of reasons. In the case of medications and pesticides, such encapsulation may be desired to achieve the controlled release of the medication or pesticide. In the case of vitamins, the encapsulation may be carried out to protect the vitamin from air-oxidation and, thus, to extend the shelf life of the vitamin. In the case of a flavoring agent, the encapsulation may be carried out to place the flavoring agent in an easily metered form which will release the flavoring agent at a controllable event, such as the addition of water.

It is generally known to skilled practitioners in the field of flavor encapsulation that current practical commercial processes leading to stable, dry flavors are generally limited to spray drying and extrusion fixation. The former process requires the emulsification or solubilization of the flavor in a liquid carrier containing the encapsulating solids, followed by drying in a high temperature, high velocity gas stream and collection as a low bulk density solid.

While spray drying accounts for the majority of commercial encapsulated materials, several limitations of the process are evident. Low molecular weight components of complex or natural flavor mixtures may be lost or disproportionate during the process. The resultant flavor-carriers are porous and difficult to handle. In addition, deleterious chemical reactions such as oxidation can result on surfaces exposed during and after drying. The final product, a dry, free flowing powder, will release the encapsulant rapidly upon rehydration whether rapid release is desired or not.

U.S. Pat. No. 3,971,852, to Brenner et al., teaches the use of modified starch, gums and other natural hydro-colloids with lower molecular weight polyhydroxy compounds to yield a glassy cellular matrix with encapsulated oil at a maximum of 80 volume %. This system forms a shell surrounding the oil flavoring but is limited to lipophilic flavoring agents. Saleeb and Pickup, in U.S. Pat. No. 4,532,145, describe a process and composition in which a volatile flavorant is fixed by spray drying from a carrier solution made up of 10–30% of a low molecular weight component such as a sugar or an edible food acid with the balance of solids being a maltodextrin carbohydrate in the amount of 70–90%. U.S. Pat. No. 5,124,162, to Boskovic et al., discloses a carrier mixture composed of mono- and disaccharides (22–45%), maltodextrins (25–50%), and a high molecular weight carbohydrate such as gum arabic, gum acacia or chemically modified starch (10–35%) to which flavoring agents are added and the subsequent solution spray dried to yield a free flowing powder with a bulk density of 0.50 g/cc.

Several technical issues unmet by these approaches cited are evident. Firstly, thermally sensitive flavors undergo undesirable reactions, including oxidations, rearrangements and hydrolyses. Secondly, volatile components are lost during the atomization and evaporation in the dryer.

A second process route, that of melt encapsulation, has been utilized to advantage with lipid-based flavors. In this technology a melt is prepared in the form of a high solids carbohydrate syrup, flavoring oils with emulsifier are added under pressure, agitated, and dispersed, and the mixture is injected into a chilling, dehydrating solvent bath to obtain fine, rod-like filaments. After the solvent removal, the matrix is reduced in size and, in some cases, coated with anti-caking agents before being packed. Description of the key parameters of this process can be found in the U.S. Pat. Nos. 2,809,895 and 3,0410,180, to Swisher, U.S. Pat. Nos. 2,856,291 and 2,857,281, to Shultz, U.S. Pat. No. 3,704,137, to Beck, and subsequent improvements in the art are detailed in U.S. Pat. No. 3,314,803 for encapsulation of volatiles such as acetaldehyde.

An alternative route to encapsulating flavorings is taught by Sair and Sair, in U.S. Pat. No. 4,230,687. In this approach, high molecular weight carriers such as proteins, starches or gums are plasticized by addition of water in the presence of the encapsulate and subjected to a high shear dispersive process. The dispersed matrix plus encapsulate is then recovered and dried to yield a stable product.

Another alternative process, melt extrusion, can be utilized for flavor fixation and encapsulation. In this process, a melting system, i.e. an extruder, is employed to form the carrier melt in a continuous process. The encapsulate flavor is either admixed or injected into the molten carbohydrate carrier. Saleeb and Pickup teach, in U.S. Pat. No. 4,420,534, use of a matrix composition consisting of 10 to 30 wt % of a low molecular weight component chosen from a series of mono- or disaccharides, corn syrup solids, or organic acid with the balance of the mixture being maltodextrin. The matrix base is dry blended with an anhydrous liquid flavoring component and melted in a single screw extruder to yield a solid matrix characterized as a glass with a glass transition temperature >40° C.

Levine and Slade, in U.S. Pat. Nos. 5,087,461 and 5,009,900, teach a similar approach utilizing a composition consisting of a modified food starch, maltodextrin, polyol, and mono- and disaccharide components. The starch is a chemically modified, water-soluble starch and is used in an amount of 40 to 80% of the total mixture. The balance of the composition is comprised of 10–40% of maltodextrin, 5 to 20% of corn syrup solids or polydextrose and 5–20% of mono- or disaccharide. This matrix is made to balance processing response with glass matrix character.

In the two preceding examples in the '461 and '900 patents, the matrix composition was carefully defined to accommodate the processing limitations of the extruder as well as to generate a stable matrix being in the glassy state and characterized by a glass transition temperature of >40° C.

Formation of a matrix in the glass state is of particular value for encapsulation of water-soluble flavorings and extracts. In these cases, the role of water as a plasticizing agent conflicts with this desired result, because water in the final product has the effect of lowering the glass transition temperature ($T_g$) of the glassy matrix. In model studies of a number of food carbohydrate systems, the upper limit of water content is approximately 7–10 wt. % for lower molecular weight components such as mono- and disaccharides, maltodextrins and combinations of these agents. At higher water contents, the $T_g$ is lowered to the extent that the matrix is in the undesirable rubbery or plastic state at room temperature.

In order to insure higher $T_g$'s there are several options available. By limiting the class of encapsulate materials to lipophilic materials such as citrus oils, plasticizing moisture may be removed by a boil off process as described in U.S. Pat. No. 2,809,895. Alternatively, the use of melt encapsulation as taught in U.S. Pat. No. 4,420,534 limits the flavoring agents to materials with lower vapor pressure which can be admixed to the premelt composition. In addition, flavorings which are in the form of aqueous extracts, water, and alcohol-water solutions will result in a product with a $T_g$ much below 25° C. leading to plastic flow and loss of volatiles upon storage.

Similarly, in U.S. Pat. No. 5,009,900, the flavorings are limited to those with limited volatility and total moisture levels in the final product are less than 11% by weight. Many of the key topnotes and unique flavor components of complex flavors have high vapor pressures at room temperature and are not easily encapsulated by such a process.

Preparation of a solid in the glass state is dependent upon both matrix composition and the process used to generate the encapsulating material. The advantages of retaining the glass form of the matrix is increased physical stability of the solid, reduced loss of incorporated volatiles, and reduction of deleterious intermolecular reactions. A detailed discussion of the physical chemistry of water-food polymer interactions as relating to the glassy state and their transition temperatures can be found in H. Levine and L. Slade, "Glass Transitions in Foods", pgs. 83–205 in *Physical Chemistry of Foods,* H. Schwartzberg and R. Hartel, Eds., Marciel Dekker, New York, 1992; and H. Levine and L. Slade, "Water as a Plasticizer: physico-chemical aspects of low-moisture polymeric systems", pgs. 79–185 in *Water Science Reviews,* Vol. 3, F. Franks, Ed., Cambridge University Press, London, 1988, which are incorporated herein by reference. The role of water as plasticizer with food polymers, as well as the relationships between molecular composition and dynamics of interactions between various components, are discussed in these references.

Thus, there remains a need for encapsulation compositions in which an encapsulate is encapsulated in a matrix which is stable in the glass state at ambient temperatures. In particular, there remains a need for flavor encapsulation compositions in which a flavoring agent is encapsulated in a matrix which is stable in the glassy state at room temperature, i.e., has a $T_g$ sufficiently high to prevent caking and plastic flow at ambient temperatures. There also remains a need for flavor encapsulation compositions which have a high $T_g$ and are amenable for encapsulating volatile and sensitive flavor components.

SUMMARY OF THE INVENTION

Accordingly, it is one object of the present invention to provide novel encapsulation compositions in which an encapsulate is encapsulated in a matrix which is stable in the glassy state at ambient temperatures.

It is another object of the present invention to provide novel flavor encapsulation compositions in which a flavoring agent is encapsulated in a matrix which is stable in the glassy state at ambient temperatures.

It is another object of the present invention to provide novel flavor encapsulation compositions which are amenable to the encapsulation of volatile or sensitive flavor components.

These and other objects, which will become apparent during the following detailed description, have been achieved by the inventors' discovery that it is possible to prepare carbohydrate-based glassy matrices, which have a sufficiently high $T_g$ to prevent plastic flow and caking at ambient temperatures, by interacting one or more carbohydrate food polymers with an aqueous plasticizer in the melting zone of an extruder and extruding the resulting mixture.

The inventors have also discovered that a composition comprising:

(A) an encapsulate, encapsulated in:
(B) a glassy matrix, comprising:
(a) 95 to 100 wt. % of a maltodextrin having 5 to 15 dextrose equivalents (D.E.); or
(b) 45 to 65 wt. % of a maltodextrin having 5 to 15 D.E. and 35 to 55 wt. % of corn syrup solids having 24 to 42 D.E.; or
(c) 80 to 95 wt. % of a maltodextrin having 5 to 15 D.E., 1 to 15 wt. % of a salt of an organic acid, and 0 to 15 wt. % of an organic acid; or
(d) 25 to 80 wt. % of a maltodextrin having 5 to 15 D.E., 2 to 45 wt. % of a food polymer, and 10 to 30 wt. % of a mono- or disaccharide or corn syrup solids having 24 to 42 D.E.; or
(e) 45 to 80 wt. % of a maltodextrin having 5 to 15 D.E., 2 to 22 wt. % of a carbohydrate polymer having carboxylate or sulfate side groups, 5 to 30 wt. % of corn syrup solids having 24 to 42 D.E., and 0.2 to 2.0 wt. % of a soluble calcium salt; or
(f) 30 to 100 wt. % of a modified starch (e.g. sodium octenyl succinate modified starch), and 0 to 70 wt. % of a mono- or disaccharide; or
(g) 85 to 100 wt. % of a modified starch (e.g. sodium octenyl succinate modified starch), and 0 to 15 wt. % of a polyhydric alcohol, are stable in the glassy state, i.e., have a sufficiently high $T_g$ to prevent plastic flow and caking at ambient temperature.

The present encapsulation compositions may be prepared by a process comprising:

(i) mixing (a), (b), (c), (d), (e), (f), or (g) with a liquid plasticizer and an encapsulate in an extruder, to obtain a melted matrix; and
(ii) extruding said melted matrix.

In one preferred embodiment, the present compositions are prepared by utilizing as the liquid plasticizer a concentrated or saturated aqueous solution of the matrix mixture or selected mixture components and the plasticizer is added to the melting zone of an extruder. In another preferred embodiment, a concentrated aqueous solution of calcium salt being in the hydrated form is used as the plasticizer for interaction with calcium reactive polymers.

The encapsulate is continuously added in a liquid phase, following the melting of the carbohydrate matrix, by injection under pressure and mixing before exiting the extruder die.

In another embodiment, the present method employs a venting step of the volatile plasticizer following the melt to reduce the moisture content to below 10% moisture in the final product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

As noted above, the present invention has been made possible, in part, by the inventor's discovery that it is possible to prepare carbohydrate-based glassy matrices, which have a sufficiently high $T_g$ such that the glassy matrix is stable at ambient temperatures, with use of aqueous plasticizer. Thus, the inventors have discovered that with use of aqueous plasticizer it is possible to prepare a maltodextrin- or modified starch-based glassy matrix which does not undergo plastic flow or caking at ambient temperatures. This discovery is a surprising result considering the well-known, large glass-transition-lowering effect of water in carbohydrate systems. Accordingly, before the present invention, one skilled in the art would not have expected that a stable glassy carbohydrate- or maltodextrin-based matrix could have been practically prepared using an aqueous plasticizer.

In one embodiment, the present invention relates to active agent encapsulation compositions in which (A) an encapsulate is encapsulated in (B) a glassy matrix comprising:

(a) 95 to 100 wt. % of a maltodextrin having 5–15 D.E.; or (b) 45 to 65 wt. % of a maltodextrin having 5 to 15 D.E. and 35 to 55 wt. % of a corn syrup solid having 24 to 42 D.E.;

(c) 80 to 95 wt. % of a maltodextrin having 5 to 15 D.E., 1 to 15 wt. % of a soluble or meltable salt of an organic acid, and 0 to 15 wt. % of an organic acid; or (d) 25 to 80 wt. % of a maltodextrin having 5 to 15 D.E., 2 to 45 wt. % of a food polymer, and 10 to 30 wt. % of a mono- or disaccharide or corn syrup solids having 24 to 42 D.E.; or (e) 45 to 80 wt. % of a maltodextrin having 5 to 15 D.E., 2 to 22 wt. % of a carbohydrate polymer having carboxylate or sulfate side groups, 5 to 30 wt. % of corn syrup solids having 24 to 42 D.E., and 0.2 to 2.0 wt. % of a soluble calcium salt; or (f) 30 to 100 wt. % of a modified starch (e.g. sodium octenyl succinate modified starch), and 0 to 70 wt. % of a mono- or disaccharide; or (g) 85 to 100 wt. % of a modified starch (e.g. sodium octenyl succinate modified starch), and 0 to 15 wt. % of a polyhydric alcohol.

The term encapsulate, as used in the present invention, includes agents such as medications, pesticides, preservatives, vitamins, flavoring agents, perfumery chemicals and fragrances, and food colorants both synthetic and natural. Suitable medications include antacids, anti-inflammatory substances, coronary vasodilators, cerebral vasodilators, peripheral vasodilators, anti-infectives, psychotopics, antimanics, stimulants, antihistamines, laxatives, decongestants, vitamins, gastrointestinal sedatives, antidiarrheal preparations, antianginal drugs, antiarrhythmics, antihypertensive drugs, vasoconstrictors, migraine treatments, anticoagulants, antithrombotic drugs, analgesics, antipyretics, hypnotics, sedatives, antiemetics, antinauseants, anticonvulsants, neuromuscular drugs, hyper- and hypo-glycaemic agents, thyroid and antithyroid preparations, diuretics, antispasmodics, uterine relaxants, mineral and nutritional additives, antiobesity drugs, anabolic drugs, erythropoietic drugs, antiasthmatics, expectorants, cough suppressants, mucolytics, antiuricemic drugs and other drug substances such as topical analgesics, local anesthetics and the like.

Suitable pesticides include insecticides, nematocides, fungicides, herbicides, and microbicides. Insecticides, which may be encapsulated in the present compositions include those disclosed in Kirk-Othmer, *Encyclopedia of Chemical Technology*, 3rd Ed., vol. 13, Wiley, N.Y., pp. 413–485 (1981), which is incorporated herein by reference. Suitable nematocides include, e.g., methyl N',N'-dimethyl-N-[(methylcarbamoyl)oxy]-1-thiooxamimidate (oxamyl) and those disclosed in Kirk-Othmer, *Encyclopedia of Chemical Technology*, 3rd Ed., vol. 18, Wiley, NY, pp. 305–8 (1982), which is incorporated herein by reference. Suitable fungicides include those disclosed in Kirk-Othmer, *Encyclopedia of Chemical Technology*, 3rd Ed. vol. 11, Wiley, N.Y., pp. 490–498 (1980), which is incorporated herein by reference. Suitable herbicides include those disclosed in Kirk-Othmer, *Encyclopedia of Chemical Technology*, 3rd Ed., vol. 12, Wiley, N.Y., pp. 297–351 (1980), which is incorporated herein by reference. Suitable antibiotics and antimicrobials include those disclosed in Kirk-Othmer, *Encyclopedia of Chemical Technology*, 4th Ed., vol. 2, Wiley, N.Y., pp. 854–1018 (1992) and vol. 3, pp. 1–346 (1992), both of which are incorporated herein by reference. Suitable vitamins include those disclosed in Kirk-Othmer, *Encyclopedia of Chemical Technology*, 3rd Ed. vol. 24, Wiley, N.Y., pp. 1–277 (1984), which is incorporated herein by reference. Suitable food additives, in addition to flavoring agents, include those disclosed in Kirk-Othmer, *Encyclopedia of Chemical Technology*, 3rd Ed., vol. 11, Wiley, N.Y., pp. 146–163 (1980), which is incorporated herein by reference.

The term flavoring agent includes spice oleoresins derived from allspice, basil, capsicum, cinnamon, cloves, cumin, dill, garlic, marjoram, nutmeg, paprika, black pepper, rosemary and tumeric; essential oils: anise oil, caraway oil, clove oil, eucalyptus oil, fennel oil, garlic oil, ginger oil, peppermint oil, onion oil, pepper oil, rosemary oil, spearmint oil; citrus oils: orange oil, lemon oil, bitter orange oil and tangerine oil; alliaceous flavors: garlic, leek, chive, and onion; botanical extracts: arnica flower extract, chamomile flower extract, hops extract, and marigold extract; botanical flavor extracts: blackberry, chicory root, cocoa, coffee, kola, licorice root, rose hips, sarsaparilla root, sassafras bark, tamarind and vanilla extracts; protein hydrolysates: hydrolyzed vegetable protein (HVP's), meat protein hydrolyzates, milk protein hydrolyzates; and compounded flavors both natural and artificial including those disclosed in S. Heath, *Source Book of Flavors*, Avi Publishing Co., Westport, Conn., 1981, pp. 149–277. Representative flavor compounds are for example: benzaldehyde, diacetyl (2,3-butanedione), vanillin, ethyl vanillin and citral (3,7-dimethyl-2,6-octadienal). The flavoring agent may be in the form of an oil, aqueous solution, non-aqueous solution or an emulsion. Flavor essences, i.e. the water soluble fraction derived from fruit or citrus can be utilized although at lower levels than the ingredients referenced above. As will be described more fully below, the present invention is particularly advantageous when the flavoring agent is itself a volatile compound or is a mixture comprising a number of volatile compounds with varying vapor pressures at ambient conditions.

When the encapsulate is lipophilic, the encapsulate is dispersed in the glassy matrix of the final product usually with the aid of an emulsifier added to the lipophilic phase or in the matrix mixture. In contrast, when the encapsulate is hydrophilic or water-soluble, the final product contains the encapsulate as a dissolved solute and/or as a dispersed encapsulant.

Although the exact amount of encapsulate encapsulated in the matrix will depend, in part, on the precise nature of the matrix, the identity of the encapsulate, and the anticipated end use of the final composition, the encapsulation compositions of the present invention will typically comprise 2.5 to 15 wt. % of encapsulate, based on the total weight of the encapsulation composition. Preferably, the present encapsulation compositions will comprise 7 to 12 wt. % of encapsulate, based on the total weight of the composition. It is preferred that the encapsulate is a flavoring agent.

In addition to the foregoing encapsulates, various optional ingredients such as are conventionally used in the art, may be employed in the matrix of this invention. For example, colorings, sweeteners, fragrances, diluents, fillers, preservatives, anti-oxidants, stabilizers, lubricants, and the like may be employed herein if desired.

As noted above, the encapsulate is encapsulated in a glassy matrix of one of (a), (b), (c), (d), (e), (f), or (g). In all of the definitions of matrices (a), (b), (c), (d), (e), (f) and (g), all wt. % values are based on the total weight of the glassy matrix (B).

In one embodiment, the glass matrix comprises (a) 95 to 100 wt. % of a maltodextrin having 5–15 D.E. Preferably, in embodiment (a), the glass matrix comprises 95 to 97 wt. % of a maltodextrin having 5–15 D.E.

The relationship between the glass transition temperature and moisture content for a maltodextrin matrix has been described by Y. Roos and M. Karel, *J. Food Science*, Vol. 56(6), 1676–1681 (1991), which is incorporated herein by reference. $T_g$, the glass transition temperature, increases with decreasing moisture content or increasing molecular weight of the maltodextrin. The experimental procedure for the glass formation described by Roos and Karel in this reference is not amenable to commercial application. Also noteworthy is that the system described in this reference, maltodextrin solids and moisture, does not include organic flavor solutes. Incorporation of water-soluble low molecular weight compounds contributed by most flavors would act as a plasticizer in such a matrix.

Commercial maltodextrins are usually prepared from hydrolysis of a selected corn starch. The resulting maltodextrin products are obtained as complex mixtures of carbohydrate oligomers which also contain minor amounts of mono- and disaccharides. Any commercial maltodextrin with a dextrose equivalent (D.E.) of 5 to 15 may be suitably utilized. However, maltodextrins with 10 to 15 D.E. are preferred. The term dextrose equivalent (D.E.) as used in the present specification refers to the percentage of reducing sugars (dry basis) in a product calculated as dextrose. Good results have been achieved using Lodex 10 of American Maize Company (Hammond, Ind.). Other commercial maltodextrin-like materials obtained from rice, wheat, and tapioca starches as well as agglomerated forms of maltodextrins such as the Penwest Food Product, Soludex, are also suitable.

Although the matrix of embodiment (a) is described as comprising 95 to 100 wt. % of a maltodextrin having 5 to 15 D.E., it should be understood that such material as commercially supplied contains 4 to 7 wt. % of moisture and that this water content is implicit in the term "maltodextrin" as used above. In addition, water is also introduced into the final matrix by the use of the present aqueous plasticizers. Similarly, many of the starting materials in embodiments (b), (c), (d), (e), (f), and (g) will also contain moisture as commercially supplied, and water will also be introduced into the final matrix composition by use of the present aqueous plasticizers.

Accordingly, it is to be understood that in all of the definitions for embodiments (a), (b), (c), (d), (e), (f), and (g) of the glassy matrix, the relative amounts of the various components are expressed on the basis of the relative amounts of each component used as received from the commercial supplier. In other words, although the components of the glassy matrices are used as received from the supplier and thus contain some moisture, the relative amounts of the components in the glassy matrices are expressed as if the commercially supplied components were completely moisture-free. It should be further understood that, although the final glassy matrix may contain water, the water content is not expressly stated.

The amount of water permissible in the final glass matrix is functionally limited by the desired $T_g$ of the glass matrix. Thus, the glass matrix will suitably contain water in an amount less than that which would lower the $T_g$ below 35° C. Preferably, the glass matrix will contain water in an amount less than that which would lower the $T_g$ of the matrix below 40° C. Although the exact upper limit on the amount of water will depend on the identity of the component ingredients of the glassy matrix, typically the amount of water present will be 5 to 10 wt. %, based on the total weight of the glassy matrix, preferably 5 to 9 wt. %, based on the total weight of the glassy matrix.

When, in embodiment (a), the matrix comprises less than 100 wt. % maltodextrin (water implicit), then the balance of the matrix may comprise up to 5 wt. % of any component which does not adversely effect either the matrix or the encapsulate. Lower molecular weight carbohydrates, such as glucose, sucrose, maltose, and 24 to 42 D.E. corn syrup solids, yield more easily processed matrices when added as additional components. Other processing aids in the form of extrusion "slip agents" are food emulsifiers, which can combine the concomitant function of processing aid and surfactant, include the distilled monoglycerides of fatty acids, distilled propylene glycol monoesters of fatty acids, distilled succinylated monoglycerides of fatty acids such as the Myverol product series available from Eastman Chemicals Co.; sorbitan fatty acid esters, polyoxyethylene(s) sorbitan monoesters of fatty acids; distilled acetylated monoglycerides of fatty acids, mono-diglycerides of fatty acids and fats and oils from food lipid sources. These may be added in amounts of 0.25 to 2.5 wt. %.

When the matrix is (a), the liquid plasticizer may be water. Alternatively, maltodextrin melts can also be facilitated by use of a plasticizing agent prepared as an aqueous maltodextrin solution. The advantage of this latter procedure is to insure adequate hydration and rapid dispersion of liquid plasticizer into the dry mixture in an extruder. A maltodextrin solution having any concentration up to supersaturation can be employed as the liquid plasticizer in this procedure. Similarly, water-flavoring agent solutions and water-alcohol flavoring agent mixtures, such as vanilla extracts can be preconcentrated with solids from the dry maltodextrin base to yield a syrup which may be used as the liquid plasticizer.

When a plasticizing system consisting of a 50% [w/w] aqueous solution of Lodex-10 as obtained from the supplier, was employed in an amount of 0.9 lb with 16.9 lb of Lodex 10, the resultant matrix obtained had a water content of 9.8 wt. % (by Karl Fisher method) and a $T_g$ of 44° C.

In embodiment (b), the glassy matrix comprises 45 to 65 wt. % of a maltodextrin having 5 to 15 D.E., preferably 48 to 62 wt. % of a maltodextrin having 5 to 15 D.E., and 35 to 55 wt. % of a corn syrup solid having 24 to 42 D.E., preferably 38 to 52 wt. % of a corn syrup solid having 24 to 42 D.E. The same types of maltodextrins utilized in embodiment (a) are suitably used in embodiment (b). Thus, the maltodextrins used in embodiment (b) preferably have 10 to 15 D.E.

When the encapsulate to be encapsulated is pH sensitive, it is preferred that the glassy matrix comprise (c). Many pure compounds and flavorings systems are pH sensitive. It is well known that heating of food carbohydrate polymers in the amorphous form in the presence of acidic or basic agents will lead to carmelizaton and result in off-flavor development and color formation. Moreover, the presence of low molecular weight acids can be detrimental to flavors present during the melt encapsulation process.

When the matrix is (c), it comprises 80 to 95 wt. % of a maltodextrin having 5 to 15 D.E., 1 to 15 wt. % of a soluble or meltable salt of an organic acid, and 0 to 15 wt. % of an organic acid, dry basis. The matrix, in embodiment (b), preferably comprises 80 to 90 wt. % of a maltodextrin having 10 to 15 D.E., 1 to 14 wt. % of a soluble or meltable salt of an organic acid, and 0 to 13 wt. % of an organic acid, dry basis. The same types of maltodextrins which are suitable for use in embodiment (a) are also suitable for embodiment (c). Further, as described above with reference to embodiment (a), it should be understood that the maltodextrin used in embodiment (c) will typically contain 5 to 8 wt. % of moisture as received from the commercial supplier and that moisture will also be introduced into the final matrix by the use of the present aqueous plasticizers.

Suitable organic acids include those such as citric, malic, adipic, cinnamic, fumaric, maleic, succinic, and tartaric acid, and the mono-, di-, or tribasic salts of these acids are suitable organic acid salts. Suitable salts of these acids are the soluble or meltable salts and include those salts in which one or more acidic protons are replaced with a cation such as sodium, potassium, calcium, magnesium, and ammonium. Preferred salts include the sodium and potassium salts of citric acid.

The buffer is suitably prepared having a ratio of acid to trisodium acid salt of 10:1 to 1:4, preferably 4:1 to 1:2; or an acid to disodium salt ratio of 10:1 to 1:6, preferably 3:1 to 1:3; or an acid to monosodium acid salt ratio of 10:1 to 1:10, preferably 2:1 to 1:2. Mixed buffers can be prepared in which the acid and acid salt are from different acids.

When the acid and/or acid salt exist in a high melting crystalline form, then the addition of moisture may not plasticize or melt the acid-acid salt rapidly in the mixture with the maltodextrin. Furthermore, addition of excess water, in this case, would result in a lowering of the $T_g$ of the resulting matrix to an undesirable level. Accordingly, in such cases it is preferred to co-mill the acid/acid salt mixture prior to mixing with the maltodextrin. It has been found that co-milling the acid/acid salt mixture generates an amorphous binary solid solution. This binary solid may then be mixed with desired ternary component such as a maltodextrin and the mixture melt-extruded.

The co-milling of the acid/acid salt mixture may be carried out in any conventional milling apparatus such as ball mills and centrifugal impact mills. Typically the acid and acid salt are combined in the proportions to be used in the matrix and milled. A single pass through a Brinkmann laboratory impact mill fitted with 0.5 mm screen is adequate to convert all the crystalline phases of a citric acid-trisodium citrate mixture into the amorphous, non-crystalline state as determined by DSC.

Figure 1:
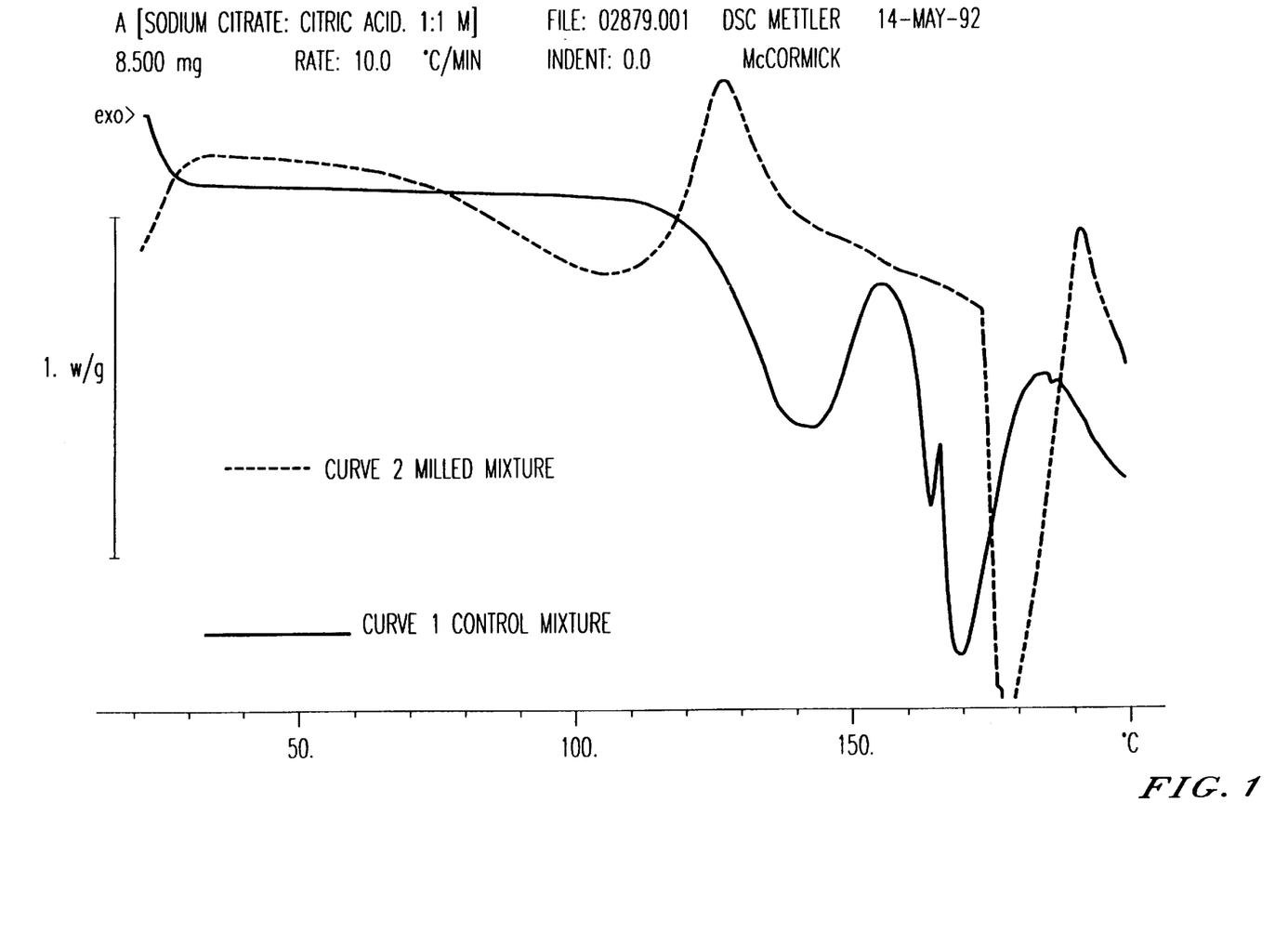
FIG. 1 illustrates the effect of milling on the physical state of a citric acid-sodium citrate buffer mixture.

FIG. 1 shows the effect of milling on the physical state of the citric acid-sodium citrate buffer mixture as evidenced by DSC thermal analyses. Curve 1 (–) represents the thermogram of an unprocessed mixture. Two melt transitions are evidenced corresponding to the melting of the acid and acid salt respectively. Curve 2 (---) represents the identical mixture after a single pass through a Brinkmann impact mill. The amorphous character is noted by a change in baseline corresponding to the 60–100° C. region. The exotherm centered at approximately 120° C. indicates recrystallization of an amorphous component(s). Finally, at the higher temperature region of the scan, the crystalline phases undergo a melt transition. This amorphous mixture will ultimately return to the more stable crystalline state, i.e., samples made as described above exhibit only melt transitions after 10 days at ambient temperature. The benefit in the use of the amorphous acid-acid salt ingredient is increased speed and ease of solution into the maltodextrin melt.

In another embodiment, the matrix is (d), a mixture comprising 25 to 80 wt. % of a maltodextrin having 5 to 15 D.E., 2 to 45 wt. % of a food polymer, and 10 to 30 wt. % of a mono- or disaccharide or corn syrup solids having 24 to 42 D.E., dry basis. Preferably in embodiment (d), the matrix comprises 45 to 70 wt. % of a maltodextrin having 10 to 15 D.E., 5 to 20 wt. % of a food polymer, and 25 to 30 wt. % of a mono- or disaccharide or corn syrup solids having 24 to 42 D.E.

Examples of suitable food polymers include methyl cellulose, hydroxypropyl methyl cellulose, high methoxypectin, gum arabic (acacia), locust bean gum, guar gum; the lesser utilized natural gums such as gum ghatti, gum tragacanth, gum karaya; proteins such as gelatin or α-casein; microbial gums such as xanthan, or gellan; pregelatinized starches in addition to carbohydrate polymers such as inulins, beta-glucans and konjac flour. Methyl cellulose and hydroxypropyl methyl cellulose are preferred.

For some of the compounds used as the food polymer in embodiment (d), the molecular weight is essentially controlled by the source and, in fact, may not be precisely known. For example, the gums listed above are not characterized or described by those of skill in the art in terms of molecular weight. Instead, such gums are fully characterized by identification of their source. Thus, e.g., the term "gum arabic" fully and completely defines a particular composition and no further characterization is required.

In contrast, the molecular weight of a cellulose ether, such as methyl cellulose or hydroxypropyl methyl cellulose, is generally expressed in terms of the viscosity at 20° C. of an aqueous solution containing 2 wt. % of the cellulose ether. Suitable cellulose ethers for use in embodiment (d) are those having a viscosity of 3 to 100,000 centipoises, preferably 4000 to 15,000 centipoises. Cellulose ethers are also characterized in terms of the degree of hydroxypropoxyl and methoxyl substitution. The term "methoxy degree of substitution" (MDS) refers to the average number of methyl ether groups present per anhydroglucose unit of the cellulose molecule. The term "hydroxypropoxyl molar substitution" (HPMS) refers to the average number of moles of propylene oxide which are reacted with each anhydroglucose unit of the cellulose molecule. In embodiment (d), the methyl cellulose suitably has a MDS of from 19 to 31, preferably 27 to 31. The hydroxypropyl methyl cellulose suitably has a MDS of from 19 to 30, preferably 24 to 30, and a HPMS of from 4 to 12, preferably 7 to 12.

Gelatin is not usually characterized in terms of molecular weight but instead is characterized in terms of "Bloom" or jelly strength as measured with a Bloom Gelometer. In embodiment (d), suitable gelatins are those having a Bloom of 50 to 300, preferably 100 to 300. Both Type A and Type B gelatin may be used.

The same types of maltodextrins described as being suitable for embodiments (a), (b), and (c) are also suitable for embodiment (d). Preferably the maltodextrin has 10 to 15 D.E. in embodiment (d).

Mono- and disaccharides suitable for use in embodiment (d) include glucose, fructose, galactose, ribose, xylose, sucrose, maltose, lactose, cellobiose, and trehalose; polyols, e.g., glycerin and propylene glycol; as well as corn syrup solids, high fructose corn syrups, high maltose corn syrups and hydrogenated corn syrups. Preferred are glucose and maltose. Corn syrup solids having 24 to 42 D.E. are also preferred.

Glass matrices prepared from low molecular weight components such as monosaccharides, disaccharides, corn syrup solids and maltodextrins are stable at ambient conditions if the glass exhibits a $T_g$ of >30° C. However, release of solutes is relatively rapid when placed in aqueous media. A common method for controlled release in the pharmaceutical industry employs direct compression of tablets prepared with methyl cellulose and hydroxypropyl methyl cellulose in various combinations from 98% to less than 26% of modified celluloses. The procedures employ dry blending of all components followed by a wet or dry tableting process. These teachings are described in part in the technical brochure "Formulating for Controlled Release with METHOCEL Premium Cellulose Ethers" Dow Chemical Company, Midland, Mich., 1987, but are not directly applicable to volatile and liquid agents as desired by the food industry.

It has now been found that modified cellulose ethers such as methyl cellulose [Methocel A; Dow Chemical Co.], hydroxypropyl methyl cellulose [Methocel E,F,J,K; Dow Chemical Co.], when combined with a maltodextrin or maltodextrin-sugar solids base, yield glassy matrices with increased $T_g$, which are suitable for the encapsulation of volatile flavorings and flavor compounds. In addition, the modified cellulose polymer rehydrates to develop increased viscosity of the matrix and slow the diffusion of the solute agents into the aqueous media, upon hydration in application, i.e., from extraneous water in contact with the glass-flavor matrix.

An exemplary series of methyl cellulose/hydroxypropyl methyl cellulose mixtures were prepared and are shown below. The mixtures have the composition ranges of:

| a] Methyl cellulose | [Dow, Methocel A4M] | 2 to 45 wt. % |
|---|---|---|
| b] Maltodextrin | [American Maize, Lodex-10] | 20 to 80 wt. % |
| c] Corn syrup solids | [American Maize, Frodex 42] | 20 to 30 wt. % |

More preferably the composition was made of the components in the range:

| a] Methyl cellulose | [Dow, Methocel A4M] | 4 to 25 wt. % |
|---|---|---|
| b] Maltodextrin | [American Maize, Lodex-10] | 25 to 80 wt. % |
| c] Corn syrup solids | [American Maize, Frodex 42] | 20 to 30 wt. % | and the most preferred mixture had a composition of:

| a] Methyl cellulose | [Dow, Methocel A4M] | 5 to 20 wt. % |
|---|---|---|
| b] Maltodextrin | [American Maize, Lodex-10] | 45 to 75 wt. % |
| c] Corn syrup solids | [American Maize, Frodex 42] | 25 to 30 wt. % |

Encapsulation was tested utilizing an extruder to which moisture was added to the original dry mix at the feed port. Simultaneously with the addition of the water, orange oil containing selected emulsifier, was injected into the melt zone of the extruder. The added moisture is limited to addition of no more than 3 to 5 wt. % additional moisture to the dry mix. Analysis of the encapsulating matrix shows $T_g$'s in the range of 35 to 50° C.

In another embodiment, the matrix comprises (e) 45 to 80 wt. % of a maltodextrin having 5 to 15 D.E., 2 to 22 wt. % of a carbohydrate polymer having carboxylate or sulfate groups, 5 to 30 wt. % of corn syrup solids having 24 to 42 D.E., and 0.2 to 2.0 wt. % of a water-soluble calcium salt, dry basis. Preferably, matrix (e) comprises 40 to 80 wt. % of a maltodextrin having 10 to 15 D.E., 4 to 15 wt. % of a carbohydrate polymer having carboxylate or sulfate groups, 10 to 25 wt. % of corn syrup solids having 24 to 42 D.E., and 0.4 to 1.8 wt. % of a water-soluble calcium salt, dry basis.

Suitable carbohydrate polymers having carboxylate or sulfate groups are water-soluble and are represented by sodium carboxymethyl cellulose (CMC), low methoxy pectin(s), sodium alginate, and {kappa} and {iota} carrageenan(s).

The molecular weight of sodium carboxymethyl cellulose is generally expressed in terms of viscosity at 25° C. of an aqueous solution containing 1 wt. % of the sodium carboxymethyl cellulose. In embodiment (e), the sodium carboxymethyl cellulose suitably has a viscosity of 50 to 8000 centipoises, preferably 2000 to 8000 centipoises. In addition sodium carboxymethyl cellulose may be characterized in terms of the degree of substitution (DS) of the hydroxyl groups at carbons C-2, C-3, and C-6 of the d-glucose units. When all the hydroxyl groups are substituted the cellulose derivative is said to have a DS of 3. In embodiment (e), the sodium carboxymethyl cellulose suitably has a DS of 0.7 to 1.0, preferably 0.7 to 0.9.

Suitable low methoxy pectins are those having a degree of esterification of 0.2 to 0.5.

Sodium alginate is commercially available from Hercules Company under the trade name AQUALON® and may be used directly as received. Iota carrageenan is sold by Sigma Chemical Company under the name Carrageenan Type V.

The same types of maltodextrins used in embodiments (a)–(d) may also be used in embodiment (e). Preferably, the maltodextrin has 10 to 15 D.E. in embodiment (e). The corn syrup solid in embodiment (e) preferably has 24 to 42 D.E.

Suitable soluble calcium salts include inorganic salts such as $CaCl_2$, or $CaHPO_4$ or salts of organic acids such as calcium lactate or calcium acetate. Less preferred is the use of calcium salts of the organic acids in the crystalline form admixed with the dry components of the matrix.

The solution chemistry of food hydrocolloids containing carboxylate groups such as the polygalacturonide polymer low methoxy pectin, modified celluloses such as CMC (carboxymethyl cellulose), and the sulfate containing {kappa} and {iota}-carrageenan is known. However, it has now been found that when these polymers become plasticized in the low moisture environment of a carbohydrate melt, the interaction between carboxylate or sulfate side chain groups no longer follows the expected teachings of the food technology as known from the fully hydrated polymers in solution. It has now been found that to obtain the desired response of increased effective molecular weight of the cross-linked polymer, the calcium ion is preferably in a hydrated form. This result is achieved by use of concentrated solutions of highly soluble calcium salts, i.e., calcium lactate and calcium chloride. The large concentration of hydrated calcium ion allows limited amounts of additional free water to be added as plasticizer. In addition, separated liquid streams, one of saturated $CaCl_2$ or calcium lactate and a second of plasticizing aqueous media, can be metered to optimize the melt extrusion process and yield the largest $T_g$'s consistent with the operating conditions of the extruder.

Exemplary compositions comprised of calcium sensitive food polymer, based upon low methoxy pectin, were prepared as a dry blend as:

| [a] low methoxy pectin | 2 to 22 wt. % |
|---|---|
| [b] maltodextrin | 45 to 80 wt. % |
| [c] corn syrup solids | 5 to 30 wt. % |

A more preferred formulation range is:

| [a] low methoxy pectin | 4 to 15 wt. % |
|---|---|
| [b] maltodextrin | 45 to 80 wt. % |
| [c] corn syrup solids | 10 to 30 wt. % | and an especially preferred range is:

| [a] low methoxy pectin | 5 to 10 wt. % |
|---|---|
| [b] maltodextrin | 50 to 75 wt. % |
| [c] corn syrup solids | 15 to 25 wt. % |

The solubility of carbohydrate polymers in concentrated sugar media varies widely. For example those gums and hydrocolloids utilized in the confectionery industry e.g. high methoxy pectin, gum arabic and bacterial gums such as gellan have been found to function well in the melt extrusion process. These polymers have been found to melt under conditions that did not cause interactions of the plasticizing water and low molecular weight components to generate extremely high viscosity melts.

A series of polymers cited above were tested for melt compatibility with the maltodextrin-sugar solids-water plasticizing carrier. of these tested, the high methoxy pectin and gellan worked most efficaciously in the melt-extrusion process. The addition of these polymers also increased the glass $T_g$.

The following formulations were utilized:

| [a] | food polymer | 5 to 25 wt. % |
|---|---|---|
| [b] | maltodextrin [5–15 DE] | 40 to 80 wt. % |
| [c] | mono- or disaccharide/ or corn syrup solids [24–42 D.E.] | 10 to 30 wt. % |

A more preferred range would be:

| [a] | food polymer | 5 to 15 wt. % |
|---|---|---|
| [b] | maltodextrin [5–15 DE] | 50 to 70 wt. % |

-continued

| [c] | mono- or disaccharide/ or corn syrup solids [24–42 D.E.] | 10 to 30 wt. % |
|---|---|---|

The relative composition is dependent upon the ingredient form of the polymer. In many cases, such as with high methoxy pectin and gellan, the supplier will dilute with functional or food inert materials to standardize the ingredient for normal commercial usage. In those cases, the above compositions are adjusted to account for the additional ingredients.

In the case of gellan, a non-diluted form of the polymer was obtained from the supplier, Kelco. The following formulation would be a representative composition:

| [a] gellan (KELCOGEL ®) | 7.0 wt. % |
|---|---|
| [b] maltodextrin (Lodex-10) | 61.5 wt. % |
| [c] corn syrup solids (Frodex-42) | 30.0 wt. % |
| [d] buffer (Citric Acid: NaCitrate -1:2) | 1.5 wt. % |

The dry ingredients 'a' through 'd' were prepared as a preblended mixture and processed by melt extrusion with injection of orange oil under pressure into the matrix melt. The resulting glassy matrix containing the encapsulated orange oil had a $T_g$ of 45° C.

When the matrix is (f), the maltodextrin is replaced by a modified starch, i.e. the sodium octenyl succinate modified starch. A mixture comprising 30–100 wt. % of modified starch and the balance 0–70 wt. % of mono- or disaccharide is utilized. Preferably, in embodiment (f), the matrix comprises 60 to 90 wt. % modified starch and 10 to 40 wt. % mono- or disaccharide. A preferred modified starch is sold under the trade name of CAPSUL® (National Starch Co.) which is characterized as a sodium octenyl succinate modified starch. Similar functional ingredients are available from American Maize company as the Amiogum 23 product. Other modified starches with similar functionality include the National Starch Purity Gum BE, 1773, and 539. Suitable mono- and disaccharides include, e.g., glucose, sucrose, lactose, fructose, and maltose. Preferred are glucose, sucrose, and maltose.

When the matrix is (g), the modified starch is utilized with a plasticizer consisting of polyhydric alcohol or polyhydric alcohol-water mixtures added in a liquid feed to the base. The functional mixture then comprises 85 to 100 wt. % modified starch and 0 to 15 wt. % polyhydric alcohol. Preferably in embodiment (g) the matrix comprises 85 to 95% wt. % modified starch and 5 to 15 wt. % polyhydric alcohol. The same modified starches used in embodiment (f) may be used in embodiment (g). Suitable polyhydric alcohols include propylene glycol and glycerin.

The encapsulation compositions of the present invention may be prepared by a process involving: (i) mixing (a), (b), (c), (d), (e), (f), or (g) with a liquid plasticizer and an encapsulate in an extruder, to obtain a melted matrix; and (ii) extruding said melted matrix.

The present process may be carried out in a conventional single screw or co-rotating twin screw extruder. The choice of using a single or twin screw extruder will depend on a number of factors but mainly on the conveying properties of the matrix and the encapsulate. A single screw extruder is completely dependent on drag flow, while a twin-screw extruder provides some degree of positive pumping action.

In general, whenever a single screw extruder may be used, it may be replaced with a twin screw extruder. However, there are circumstances when a single screw extruder may not be used and a twin screw extruder is required. Such circumstances include situations when a glassy matrix with a high $T_g$ is being prepared and a low amount of aqueous plasticizer is added. In this case, use of a single screw extruder may result in caramelization of the matrix starting materials and clogging of the single screw extruder.

In the preparation of the present glassy matrices, the dry carbohydrate and any noncarbohydrate components are mixed with an aqueous plasticizer. The carbohydrate and other matrix components are referred as "dry", but, as discussed above, many of these components will actually contain moisture as received from the commercial supplier. In the present process, the matrix components may be used as received.

The aqueous plasticizer may be water, an aqueous solution or suspension of one of the matrix components (e.g., an aqueous solution of a maltodextrin), an aqueous solution or suspension of an active agent, an oil-in-water emulsion, an alcohol-water solution or suspension of an active agent (e.g., vanilla extract), an aqueous solution or suspension of an organic acid or salt of an organic acid, or an aqueous solution or suspension of a calcium salt. When the matrix is (a) or (b), it is preferred that the plasticizer is an aqueous solution or suspension of the maltodextrin. When the matrix is (c), it is preferred that the plasticizer is an aqueous solution or suspension of one or more of (i) the maltodextrin or (ii) the organic acid and/or salt of the organic acid. When the matrix is (d), it is preferred that the plasticizer is an aqueous solution or suspension of one or more of (i) the food polymer, (ii) the maltodextrin, or (iii) the mono- or disaccharide or the corn syrup solids. When the matrix is (e), it is preferred that the plasticizer is an aqueous solution or suspension of one or more of (i) the maltodextrin, (ii) the corn syrup solids, and (iii) the calcium salt or compatible constituents selected from (i), (ii), and (iii). When the matrix is (f), it is preferred that the plasticizer is an aqueous solution or suspension of (i) the monosaccharide, (ii) the disaccharide, or (iii) a mixture of mono- and disaccharide. When the matrix is (g), it is preferred that the plasticizer is an aqueous solution of the polyol.

The exact amount of aqueous plasticizer mixed with the dry matrix components will depend, in part, on the amount of moisture present in the dry matrix components as received from the supplier, the plasticizing effect, if any, of the active agent, and the $T_g$ desired for the final matrix. Usually the amount of plasticizer to be added is determined by first deciding what range of $T_g$ is desired and then experimentally determining how much aqueous plasticizer can be added while still achieving the desired $T_g$. $T_g$ (glass transition temperature) values were obtained by Differential Scanning Calorimetry (DSC) using a Mettler Thermal Analysis system employing a D-20 calorimeter cell and reported as the temperature at the mid-point of the glass transition. In general, an increase in the moisture content of the final matrix of any given composition of the present invention will lead to a decrease in the $T_g$ of the final matrix. Further, generally speaking, decreasing the total amount of water in the starting materials will decrease the water content of the final composition. By using these general relationships and the teachings of the present specification one of skill in the art can easily determine the proper amount of plasticizer to be added in order to prepare the present glassy matrices.

Thus, e.g., the starting materials will be utilized as received; the melt process is initiated by addition of excess moisture in the form of an aqueous liquid consisting of pure water or aqueous solute solution into the feed port of the extruder. Upon reaching an initial temperature and material flow equilibration, the aqueous feed is reduced until the resulting exudate matrix is obtained which upon cooling is determined to be in the glassy state. With experience using specified matrices, the minimum feed rate for the aqueous component can be set initially and the process run to yield the glassy matrix immediately.

The present encapsulation compositions are stable at ambient temperatures and, thus, have a $T_g$ of at least 35° C. Preferably, the present encapsulation compositions have a $T_g$ of at least 40° C. Thus, the glassy matrix of the present compositions will typically contain 3 to 10 wt. % of water, preferably 5 to 9 wt. % of water.

As noted above, the dry components of the matrix and the aqueous plasticizer are mixed in the heating zone of an extruder. The temperature to which the heating zone is heated will depend on the identity of the matrix material and the amount of plasticizer added. Typically, the heating zone will be heated to a temperature of 194 to 320° F., preferably 230 to 284° F.

After the plasticizer and dry matrix components have been mixed and melted, the resulting melted matrix is mixed with the active agent. This mixing is conveniently carried out in a separate extruder zone, downstream of the heating zone. Alternatively, in the case of a thermally stable active agent, the active agent may comprise one component of the aqueous plasticizer or otherwise be mixed with the aqueous plasticizer and dry matrix components in the heating zone of the extruder.

The proportion of encapsulate added will generally equal the proportion of encapsulate in the final composition. Thus, typically, the amount of encapsulate to be added will be determined by the amount of encapsulate desired in the final composition.

In the case of volatile encapsulates (such as diacetyl), some loss of encapsulate may occur by volatilization, when the hot melt exits the extruder. In these cases, the amount of encapsulate in the final composition may be controlled by adding excess encapsulate to the melted matrix to compensate for the loss due to volatilization.

In some cases, it may be necessary to add an amount of water to the dry matrix components which would ordinarily result in the amount of water in the final matrix being so great that the final composition has a lower $T_g$ than desired. Such instances may arise when the dry components are slowly hydrated, and the initial water content must be high to prevent decomposition of the dry matrix components in the melting zone of the extruder. In these cases, the amount of water in the final composition may be lowered to the required level by venting the melted matrix. Venting procedures and suitable apparatus are disclosed in U.S. patent application Ser. No. 07/948,437, which is incorporated herein by reference. In the case of a nonvolatile active agent, the venting may take place either before or after the mixing of the encapsulate with the melted matrix. In the case of a volatile active agent, the venting is preferably carried out before the mixing of the encapsulate with the melted matrix.

The final extruded composition may be used as extruded, that is, in the form of an extruded rod or filament. Alternatively, the extruded material may be further processed, preferably after cooling, by, e.g., grinding, pulverizing, etc. The ground composition may be used as is for the storage and/or sustained release of the encapsulate or it may be washed of surface oils in the case of dispersed encapsulate with food grade solvents such as ethanol, isopropanol, hexane and the residual solvent removed by standard processes.

The present encapsulation compositions are particularly useful for the encapsulation and long-term storage of flavoring agents. The present compositions permit the long-term storage of sensitive and/or volatile flavors. The compositions may be added directly to food preparations and offer the added benefit of being easily metered. In addition, the matrix components contribute little to the flavor and/or aroma of a food prepared from the present compositions.

Having generally described this invention, a further understanding can be obtained by reference to certain specific examples which are provided herein for purposes of illustration only and are not intended to be limiting unless otherwise specified.

EXAMPLES

Example 1

A carbohydrate base consisting of a 10 D.E. maltodextrin [Lodex-10, American Maize Company] was fed at a rate of 15 lbs/hr into a twin screw extruder. The jacket temperature was set to 250° F. by means of a circulating hot oil heater. Water plasticizer was added to the entry port at a rate of 7 mls/min. The encapsulate, diacetyl [Aldrich Chemical Co.], was injected into the molten mixture through a jacket port using a piston metering pump at a rate of 12 mls/minute. The exudate composed of the diacetyl-maltodextrin melt was then delivered at 200° F. through a discharge nozzle and collected at ambient pressure. Upon passive cooling, the solid, yellow matrix was characterized by differential scanning calorimetry (DSC) as a glass with a $T_g$ of 50° C. The product contained 4.9 wt % diacetyl and 8.3 wt. % moisture (by Karl Fisher analysis). Following storage of the bulk sample at ambient conditions for 4 months, the diacetyl content was analyzed at 4.0 wt. % (82% retention).

Example 2

A carbohydrate base consisting of a 10 D.E. maltodextrin [Lodex 10, American Maize Company] was fed at a rate of 15 lbs/hr into an extruder as described in Example 1. A fluid plasticizer consisting of a 50% (w/w) aqueous 10 D.E. maltodextrin solution was added to the feed port at a rate of 14 ml/min. The extruder was maintained at a jacket temperature of 250° F. Prechilled diacetyl [Aldrich Chemical Co.] was injected into the molten matrix through an injection port using a piston metering pump at a rate of approximately 12 mls/minute. The encapsulate mixture composed of the diacetyl-maltodextrin melt was delivered through a discharge nozzle and collected at ambient pressure as an expanded material which rapidly collapsed to yield a translucent yellow solid. The resultant solid was characterized by DSC as a glass with a $T_g$ of 51° C. The matrix contained 4.4 wt. % diacetyl and 7.6 wt. % moisture (by Karl Fisher analysis). Following storage of the bulk sample at ambient conditions for 4 months, the diacetyl content was analyzed at 4.0 wt. % (90% retention).

Example 3

A buffered base composition was prepared as a dry blend with the following components.

80 wt. % of 10 D.E. Maltodextrin [Lodex 10, American Maize Co.]
10 wt. % of Citric Acid [Cargill]
10 wt. % of Sodium Citrate [$Na_3$Citrate.$H_2O$, Pfizer]

The base mixture was fed at the rate of 15 lb/hr. into an extruder as described in Example 1. Water is added to the feed port at 3 ml/min. Prechilled diacetyl was injected into the molten mixture through a jacket port in the extruder using a positive displacement pump at a rate of approximately 8 ml/minute. The molten exudate composed of the buffered diacetyl-maltodextrin melt was then delivered through a discharge nozzle at 227° F. and collected at ambient pressure. Upon cooling, the matrix was characterized by DSC as a glass with a $T_g$ of 41° C., at a moisture level of 7.3 wt. % (by Karl Fisher analysis). The capsulated flavoring was determined to be 3.0 wt % of diacetyl.

The practical utility of buffered melts is best illustrated when acid or base sensitive agents are encapsulated. In a separate experimental study the flavoring compound, diacetyl, was encapsulated using the composition of sample 4 in Table I with the twin screw extruder. The melt was obtained as a dark brown solid showing the base catalyzed destruction of the alpha-dione compound.

TABLE I

Matrix-Buffer pH Responses

| Sample Matrix | Composition | Wt % | Prepared | Mixture pH | Melt pH |
|---|---|---|---|---|---|
| 1 | Lodex-10<br>$Na_3$Citrate<br>Citric Acid | 90<br>5<br>5 | this application | 3.97 | 3.77 |
| 2 | Lodex-10<br>Citric Acid | 80<br>20 | US 4,820,534 | 2.40 | 2.32 |
| 3 | Lodex-10<br>Citric Acid<br>$Na_3$Citrate | 80<br>10<br>10 | Example 3<br>this<br>application | 3.82 | 3.88 |
| 4 | Lodex-10<br>Frodex 42<br>$Na_3$Citrate | 75<br>15<br>10 | this application | 7.49 | 7.44 |

Example 4

A matrix composition containing a food polymer was prepared with the following components:

61.0 wt. % of 10 D.E. Maltodextrin [Lodex 10, American Maize Co.]
30.5 wt. % of 42 D.E. Corn Syrup Solids [Frodex-42, American Maize Co.]
7.0 wt. % of Gellan CF [KELCOGEL®, Kelco Co.]
0.5 wt. % of Citric Acid [Cargill]
1.0 wt. % of $Na_3$Citrate.$2H_2O$ [Pfizer]

The mixture was fed into a dual extruder system in which the initial melt is obtained by feeding 15 lbs/hr of the base mix into the first extruder with a jacket heated to 300° F. Water is added to the feed port at the rate of 27 mls/min to yield a molten, plastic mass. This melt was discharged with venting of moisture as steam at 268° F. into a second extruder with the jacket temperature at 300° F. A flavor load consisting of 90 parts orange oil [Citrus and Allied] in which is dissolved 10 parts polyglycerol ester emulsifier [Caprol 3G0, Witco Chemical Co.] was prepared and injected through a jacket port in the second extruder using a metering pump at a rate of 10 mls/min. The product collected from the discharge outlet of the second extruder unit was obtained as a hot, plastic mass which upon cooling set into a hard, fracturable solid. The resultant solid was characterized by DSC as a glass with a $T_g$ of 41° C., at a moisture level of 6.8 wt. % (by Karl Fisher analysis). The encapsulated flavoring was determined to be 2.9 wt % of citrus oil.

Example 5

A carbohydrate base matrix containing a functional polymer was prepared as a mixture consisting of:

- 72.5 wt. % 10.D.E. Maltodextrin [Lodex-10, American Maize Co.]
- 20.0 wt. % 42 D.E. Corn Syrup Solids [Frodex-42, American Maize Co.]
- 7.5 wt. % Methyl Cellulose [Methocel A4M, Dow Chemical Co.]

The components were dry blended as obtained. The process described in Example 1 was utilized. Water was delivered into the feed/port at 7 ml/min., and orange oil [Citrus and Allied] was injected at 12 ml/min. The encapsulated orange oil was retained at 8.3 wt. %, and the matrix was analyzed at 8.9 wt. % moisture (by Karl Fisher Analysis). The solid was characterized by DSC as a glass with a $T_g$ of 40° C.

Example 6

A matrix composition was prepared with the following components:

- 70.0 wt. % of 10 D.E. Maltodextrin [Lodex 10, American Maize Co.]
- 20.0 wt. % of 42 D.E. Corn Syrup Solids [Frodex-42, American Maize Co.]
- 10.0 wt. % of Low Methoxy Pectin [Type LM104AS, Hercules Inc.]

The extruder was set up as described in Example 1 and operated at jacket temperature of 250° F. and a feed rate of 15 lb/hr. However, two liquid feed lines were placed at the feed orifice. The first delivered water, and the second delivered an aqueous solution of 27% (w/w) calcium lactate. The water feed rate was 1 ml/min., and the calcium solution feed rate was set at 4 ml/min. orange oil [Citrus and Allied] with added polyglycerol ester emulsifier [Caprol 3GO, Witco Chemical Co.] at the ratio 90:10 (w/w) was prepared and the liquid injected at 28 ml/min. into the fluid melt. The exit temperature of the matrix was 229° F. Upon cooling to ambient conditions, the collected product resulted in a hard, fracturable solid. This solid was characterized by DSC as a glass with a $T_g$ of 39° C. The matrix was analyzed at 7.8 wt. % moisture [by Karl Fisher] and 9.2 wt. % orange oil.

Example 7

A carbohydrate base consisting of 50 wt. % of 10 D.E. maltodextrin [Lodex 10, American Maize Co.] and 50 wt. % of 42 D.E. corn syrup solids [Frodex 42, American Maize Co.] was fed at a rate of 15 lbs/hr into an extruder as described in Example 1. Water plasticizer was added to the feed port at a rate of 2.5 mls/min. The encapsulate, a compounded onion flavor, was injected into the molten mixture through a jacket port using a metering pump at the rate of 12 mls/min. The exudate was collected at ambient pressure. Upon cooling the solid matrix containing onion flavor was characterized by DSC as a glass with a $T_g$ of 37° C. at 6.6 wt. % moisture (by Karl Fisher analysis).

Example 8

A carbohydrate matrix base is prepared as follows: 10 D.E. Maltodextrin (Soludex 10, Penwest Foods, Co.) is hydrated by the addition with agitation of 5% (wt/wt) distilled water and the system equilibrated to yield a pre-plasticized carbohydrate as a free-flowing material. A buffering component composed of 12.4 parts citric acid (Pfizer) and 12.1 parts trisodium citrate dihydrate (Cargill) was mixed and blended. The mixture was milled in a Brinkmann laboratory impact mill with a single pass through a 0.5 mm screen to yield a fine, non-crystalline powder characterized as amorphous by DSC analyses (see FIG. 1).

The extrusion base is prepared by immediately combining 80 wt. % of the maltodextrin with 20 wt. % of the milled buffer component. The mixture is then blended with the encapsulate citral (Aldrich Chemical Co.) at a level of 5.0 wt. % of the total mixture. The flavor-base mixture is melt extruded in a Braebender single screw extruder, fitted with a 1:1 compression screw. Heating zones 1, 2, and 3 were set at ambient, 109° C., and 105° C. respectively and run at a screw speed of 20 rpm. The solid exudate was characterized by DSC as a glass with a $T_g$ of 41° C. and 7.2 wt. % moisture (by Karl Fisher Analyses) and a citral content of 2.6 wt. % by volatile oil analysis.

Example 9

A base consisting of CAPSULE®, a modified starch, (National Starch, Bridgewater, N.J.) was fed at a rate of 15 lb/hr into an extruder as described in Example 1. Water was added as a plasticizer at a rate of 10 ml/min. The encapsulate, orange oil, and emulsifier at a 4:1 ratio were injected into the molten mixture through a jacket port at a rate of 16 grams/min. Upon cooling, the exudate formed a hard, dense solid. The product was analyzed to have a volatile oil content of 5.7% by weight. DSC analysis of the product shows a glass transition ($T_g$) of 49° C.

Example 10

A mixture of 90 wt. % CAPSUL® modified starch (National Starch, Bridgewater, N.J.) and 10 wt. % Amerfond fondant sugar (Amstar, New York, N.Y.) was fed at a rate of 15 lb/hr into an extruder as described in Example 1. Water was added as a plasticizer at a rate of 10 ml/min. The encapsulate, orange oil, and emulsifier at a 9:1 ratio were injected into the molten mixture through a jacket port at a rate of 15 grams/min. Upon cooling, the exudate formed a hard, dense solid. The product was analyzed to have a volatile oil content of 8.3% by weight and a moisture content of 5.2%. DSC analysis of the product showed a glass transition ($T_g$) of 44° C.

Example 11

A modified starch base of CAPSULE® (National Starch, Bridgewater, N.J.) was fed at a rate of 15 lb/hr into an extruder as described in Example 1. A 1:1 mixture of water:propylene glycol was added as a plasticizer at a rate of 16 ml/min. The encapsulate, orange oil, and emulsifier at a 9:1 ratio were injected into the molten mixture through a jacket port at a rate of 14 grams/min. Upon cooling, the exudate, both with and without encapsulate, formed a hard, dense solid.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An encapsulation composition, comprising:
   (A) an encapsulate encapsulated in:
   (B) a glassy matrix of 80 to 95 wt. % of a maltodextrin having 5 to 15 D.E., 1 to 15 wt. % of a salt of an organic acid, and up to 15 wt. % of an organic acid, wherein said salt of an organic acid and said organic acid have been co-milled prior to mixing with said maltodextrin to form said glassy matrix.

2. The composition of claim 1, having a glass transition temperature of $\geq 35°$ C.

3. The composition of claim 1, having a glass transition temperature of $\geq 40°$ C.

4. The composition of claim 1, wherein said matrix comprises 80 to 90 wt. % of a maltodextrin having 10 to 15 D.E., 1 to 14 wt. % of a salt of an organic acid, and 5 to 13 wt. % of an organic acid.

5. The composition of claim 1, wherein said salt of an organic acid is a mono-, di-, or tribasic salt of an organic acid selected from the group consisting of citric acid, malic acid, adipic acid, cinnamic acid, fumaric acid, maleic acid, succinic acid, and tartaric acid, wherein one or more acidic protons of said organic acid are replaced with a cation selected from the group consisting of sodium, potassium, calcium, magnesium, and ammonium.

6. The composition of claim 1, wherein said organic acid is selected from the group consisting of citric acid, malic acid, adipic acid, cinnamic acid, fumaric acid, maleic acid, succinic acid, and tartaric acid.

7. The composition of claim 1, wherein said encapsulate is selected from the group consisting of medications, pesticides, vitamins, preservatives, and flavoring agents.

8. The composition of claim 7, wherein said encapsulate is a flavoring agent.

9. The composition of claim 8, wherein said flavoring agent is selected from the group consisting of natural extracts, oleoresins, essential oils, protein hydrolysates, aqueous reaction flavors, and compounded flavors.

10. An encapsulation composition, comprising:

(A) an encapsulate encapsulated in:

(B) a glassy matrix of 80 to 95 wt. % of a maltodextrin having 5 to 15 D.E., 1 to 15 wt. % of a salt of an organic acid, and up to 15 wt. % of an organic acid, wherein said composition is prepared by a process comprising:

(i) mixing 80 to 95 wt. % of a maltodextrin having 5 to 15 D.E., 1 to 15 wt. % of a salt of an organic acid, and up to 15 wt. % of an organic acid with a liquid plasticizer and an encapsulate in an extruder to obtain a melted matrix; and (ii) extruding said melted matrix, wherein said salt of an organic acid and said organic acid have been co-milled prior to said mixing.

11. The composition of claim 10, having a glass transition temperature of $\geq 35°$ C.

12. The composition of claim 10, having a glass transition temperature of $\geq 40°$ C.

13. The composition of claim 10, wherein said matrix comprises 80 to 90 wt. % of a maltodextrin having 10 to 15 D.E., 1 to 14 wt. % of a salt of an organic acid, and 5 to 13 wt. % of an organic acid.

14. The composition of claim 10 wherein said salt of an organic acid is a mono-, di-, or tribasic salt of an organic acid selected from the group consisting of citric acid, malic acid, adipic acid, cinnamic acid, fumaric acid, maleic acid, succinic acid, and tartaric acid, wherein one or more acidic protons of said organic acid are replaced with a cation selected from the group consisting of sodium, potassium, calcium, magnesium, and ammonium.

15. The composition of claim 10, wherein said organic acid is selected from the group consisting of citric acid, malic acid, adipic acid, cinnamic acid, fumaric acid, maleic acid, succinic acid, and tartaric acid.

16. The composition of claim 10, wherein said encapsulate is selected from the group consisting of medications, pesticides, vitamins, preservatives, and flavoring agents.

17. The composition of claim 16, wherein said encapsulate is a flavoring agent.

18. The composition of claim 17, wherein said flavoring agent is selected from the group consisting of natural extracts, oleoresins, essential oils, protein hydrolysates, aqueous reaction flavors, and compounded flavors.

19. The composition of claim 10, wherein said liquid plasticizer is selected from the group consisting of water, an aqueous solution of a maltodextrin, an aqueous solution of a mono- or disaccharide, an aqueous solution of a corn syrup solid, and aqueous solution of an acid and a salt of the acid, an aqueous solution of a calcium salt, and an aqueous solution of a polyhydric alcohol.

20. The composition of claim 1, wherein said matrix comprises 80 to 95 wt. % of a maltodextrin having 5 to 15 D.E., 1 to 15 wt. % of a salt of an organic acid, and 5 to 15 wt. % of an organic acid.

21. The composition of claim 10, wherein said matrix comprises 80 to 95 wt. % of a maltodextrin having 5 to 15 D.E., 1 to 15 wt. % of a salt of an organic acid, and 5 to 15 wt. % of an organic acid.

* * * * *